J. Johnson,
Piston-Rod Packing.
N° 37,663.                    Patented Feb. 10, 1863.
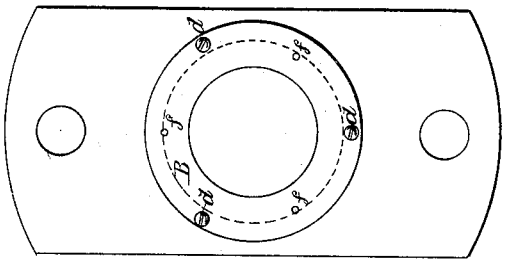
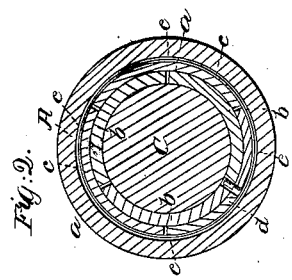
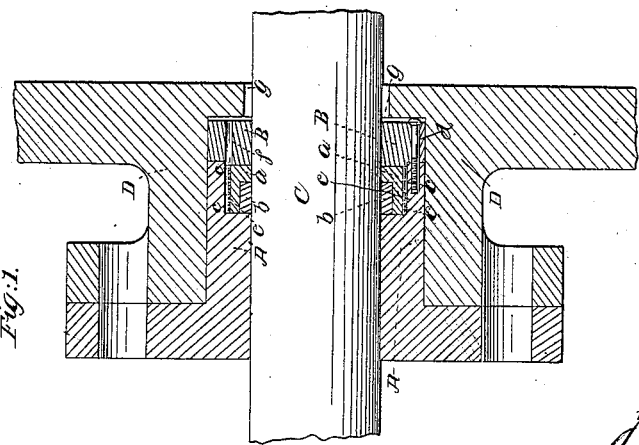
Witnesses:
J. W. Coombs.
G. W. Reed.
Inventor.
J. Johnson.
per
Munn & Co.
Att'ys.

UNITED STATES PATENT OFFICE.

JOHN JOHNSON, OF ROXBURY, ASSIGNOR TO HIMSELF AND HERBERT D. WARD, OF CAMBRIDGE, MASSACHUSETTS.

IMPROVEMENT IN PACKINGS FOR PISTON AND OTHER RODS.

Specification forming part of Letters Patent No. 37,663, dated February 10, 1863.

*To all whom it may concern:*

Be it known that I, JOHN JOHNSON, of Roxbury, in the county of Norfolk and State of Massachusetts, have invented a new and useful Improvement in Packing for Piston-Rods, Valve Stems, and other Working Parts of Engines and other Apparatus; and I do hereby declare that the following is a full, clear, and exact description of the same, reference being had to the accompanying drawings, forming part of this specification, in which—

Figure 1 is a central section of a stuffing-box with my improvement. Fig. 2 is a transverse section of the same, and Fig. 3 is an inner end view of the same.

Similar letters of reference indicate corresponding parts in the several figures.

This invention consists in a certain arrangement of two or more packing-rings of metal or other suitable material within a gland or within the cover of a stuffing-box in such a manner that the steam or other fluid to be confined may be allowed to act upon their outer peripheries for the purpose of keeping them in close contact with the rod or stem, and that the gland will serve as a box in which they are applied to and removed from the rod.

To enable others skilled in the art to make and use my invention, I will proceed to describe its construction and operation.

A is the gland, bored to fit the rod C in the usual manner, and counterbored cylindrically at its inner end large enough for the reception of the packing-rings $a$ and $b$ and a spiral spring, $c$, which surrounds them, and to form a narrow annular chamber, $e\,e$, around the exterior of the said rings for the entrance of steam or other fluid. These rings are made in segments, and the segments of the one are arranged to break joint with those of the other, as shown in Fig. 2, and to enable the two rings to be better kept together the ring $b$ is received within a recess provided for it in the ring $a$, as shown in Fig. 1. The packing-rings are held together and around the rod by means of the spring $e$ in such manner as to prevent them from being displaced when there is no pressure of steam or other fluid in the chamber $e\,e$; but instead of such a spring being used the outer packing-ring may be constructed to serve the same purpose. The rings are confined in the counterbore of the gland by an annular cap or follower, B, secured to the end of the gland by screws $d\,d$, the said follower being provided with one or more holes, $f\,f$, for the entrance of the steam or other fluid from the cylinder into the chamber $e$. The gland may be fitted to the stuffing-box D in the same manner as any ordinary gland, but care must be taken that its exterior is fitted or made steam-tight. When the gland is in place and the engine or other apparatus is in operation, the steam or other fluid being allowed to enter the stuffing-box through a narrow space, which is left around the rod, as shown at $g\,g$ in Fig. 1, pass through the holes $f\,f$ into the chamber $e$, where its pressure acts on the outer periphery of the rings $a\,b$ and causes them to hug the rod tightly and prevent any escape of steam between them, while the follower B at the same time so confines them that no steam can pass between them and the said follower or between them and the back of the counterbore. The packing-rings $a\,b$ are placed in the gland and secured by screwing on the follower B before placing the gland in the stuffing-box, and in removing the gland the packing-rings come with it, instead of being left in the stuffing-box, as is commonly the case, the gland in this case constituting a box, in which the rings are held securely, and from which they need never be taken until worn out.

The cavity provided in the gland for the rings may be in the outer instead of the inner end.

What I claim as my invention, and desire to secure by Letters Patent, is—

The arrangement of the packing-rings within the gland or stuffing-box cover substantially as herein described, whereby the gland or cover is made to constitute a box or case to contain the said rings, and in which they can be applied and removed, and provision is made for the admission of the steam or other fluid that is to be confined to act upon the outer peripheries of the rings, substantially as and for the purpose herein specified.

JOHN JOHNSON.

Witnesses:
JOSEPH W. DUDLEY,
JOSHUA SEAVER.